US010335962B1

(12) United States Patent
Rosenberg

(10) Patent No.: US 10,335,962 B1
(45) Date of Patent: Jul. 2, 2019

(54) COMPREHENSIVE FAULT DETECTION AND DIAGNOSIS OF ROBOTS

(71) Applicant: Knowledge Initiatives LLC, The Sea Ranch, CA (US)

(72) Inventor: Barr Rosenberg, The Sea Ranch, CA (US)

(73) Assignee: KNOWLEDGE INITIATIVES LLC, The Sea Ranch, CA (US)

( * ) Notice: Subject to any disclaimer, the term of this patent is extended or adjusted under 35 U.S.C. 154(b) by 0 days.

(21) Appl. No.: 15/909,869

(22) Filed: Mar. 1, 2018

Related U.S. Application Data

(60) Provisional application No. 62/465,640, filed on Mar. 1, 2017.

(51) Int. Cl.
  *B25J 9/16* (2006.01)
  *B25J 19/00* (2006.01)

(52) U.S. Cl.
  CPC ......... *B25J 19/0095* (2013.01); *B25J 9/1674* (2013.01); *Y10S 901/46* (2013.01)

(58) Field of Classification Search
  CPC .................................................... B25J 19/0095
  See application file for complete search history.

(56) References Cited

U.S. PATENT DOCUMENTS

| | | | |
|---|---|---|---|
| 5,495,410 A * | 2/1996 | Graf ....................... | B25J 9/1671 318/568.11 |
| 9,050,723 B1 * | 6/2015 | Elazary ............... | G06F 11/0793 |
| 2009/0132085 A1 * | 5/2009 | Sjostrand ........... | G05B 19/4063 700/245 |

* cited by examiner

*Primary Examiner* — Manuel A Rivera Vargas
(74) *Attorney, Agent, or Firm* — Wilson Sonsini Goodrich & Rosati

(57) ABSTRACT

A system and related systems for detecting and diagnosing fault of a robot is provided. The method comprises: performing simulations according to robot control commands; calculating discrepancy between actual performance of robot based on the control commands and the results generated by the simulation, wherein a presence of discrepancy is indicative of fault; performing diagnostic exercises according to the discrepancy to identify a cause of the fault.

16 Claims, 9 Drawing Sheets

COMPREHENSIVE FAULT DETECTION AND DIAGNOSIS OF ROBOTS

CROSS-REFERENCE

This application claims the benefit of U.S. Provisional Application No. 62/465,640, filed Mar. 1, 2017, which application is entirely incorporated herein by reference.

BACKGROUND

Robots may not function as intended or as designed. Reasons for such anomaly may include inconsistencies in the design of the robot, manufacturing flaws in individual components, assembly issues and the like. Anomalies may also result from wear and tear, accidents, physical stress during operations, malicious intrusions into the robotic system, updates and upgrades to physical components, firmware and software, and the like. For example, a care-giving robot might injure a patient due to mismatched parts, failure of a key component, or a maintenance mistake. Other potential risks may include tampering, sabotage, planting a destructive device in a robot, or hijacking control of a robot. The more comprehensive the detection and diagnosis of such anomalies, the safer it is to manufacture and operate such robots.

SUMMARY

Recognized herein is a need to comprehensively detect and accurately diagnose fault in robotic systems. Systems and related methods described herein may include a combination of sensor systems and a fault detection and diagnosis system which can be applicable to one or more robotic systems and apparatus.

The systems and related methods described herein provide numerous benefits for robot operations and operators of robots. The methods may be applicable to various types of robot and robotic systems, regardless of their design. For example, the fault detection and diagnostic exercises disclosed herein may aid in fault detection and diagnosis for a variety of types of robots and various aspects of robotic machines. The systems and methods may also be applicable to a plurality of robots. Furthermore, the methods described herein enable continued operations of robots with faulty components in some conditions. For example, the system enables adjustments to commands, parameters, and various operations of the robot in order for it to continue operating and continue to monitor its condition while one or more components of the robot are faulty.

The systems and related methods described herein may also provide additional benefits to the user. For example, the systems and methods can reliably monitor the physical and operating integrity of a complex and multi-functional robot, allowing it to operate in circumstances where any undetected or undiagnosed fault might endanger its mission and potentially lead to harm to the robot and the users. Additionally, the disclosed methods may enable characterization of fault across multiple types of robots through various fault detection and diagnosis exercises, which may or may not be specific to a single type of robot. The disclosed methods may promptly detect faults as soon as they show up in operations and preventively detect faults and minor flaws before they manifest in operations. Fault diagnostic capabilities that help to determine fault causation and make temporary compensating adjustments may increase maintenance efficiency. Improved reliability due to fault detection and diagnosis may extend the range of capabilities and missions that robotic systems can attain.

In one aspect, a computer-implemented method for detecting and diagnosing fault of a robot is provided. The method comprises: (a) performing, with aid of one or more processors, simulation of the robot based at least in part on one or more control signals as input to simulation models of the robot, wherein the one or more control signals control the operation of the robot; (b) calculating, with aid of the one or more processors, discrepancy measurements between (i) sensor data collected from a plurality of sensors during the operation of the robot and (ii) an output of the simulation models based on the one or more input control signals, wherein the discrepancy measurements beyond a pre-determined threshold are indicative of fault; and (c) performing a diagnosis exercise based at least in part on the discrepancy measurements to identify a cause of the fault, the diagnosis exercise comprising pre-determined robotic operations and/or randomly generated robotic operations.

In some embodiments, the sensor data comprises internal sensor data and external sensor data. In some cases, the internal sensor data relates to an internal state of the robot and/or motion of the robot. In some embodiments, the plurality of sensors are validated and/or authenticated. In some cases, the plurality of sensors are validated and/or authenticated by cross-checking among the plurality of sensors.

In some embodiments, the plurality of sensors include sensors onboard the robot, onboard other robots, or located in the environment of the robot. In some embodiments, the output of the simulation model and a robot's configuration derived from the sensor data are used to obtain visual information received from visual sensors that are in motion. In some embodiments, the fault comprises internal fault and/or external influence. In some embodiments, the pre-determined robotic operations are designed to diagnose a cause among multiple potential known causes. In some embodiments, the randomly generated robotic operations are designed to determine previously unknown causes. In some cases, the pre-determined robotic operations comprise vibration-inducing and strain-inducing motions of the robot. In some embodiments, the method further comprises performing Bayesian inference or self-diagnosis to identify the cause of the fault.

In another aspect, a system for detecting and diagnosing fault of a robot deployed in an environment is provided. The system comprises: one or more processors individually or collectively configured to: (a) perform simulation of the robot based at least in part on one or more control signals as input to simulation models of the robot, wherein the one or more control signals control the operation of the robot; (b) calculate discrepancy measurements between (i) sensor data collected from a plurality of sensors during the operation of the robot and (ii) an output of the simulation models based on the one or more input control signals, wherein discrepancy measurements beyond a pre-determined threshold are indicative of fault; and (c) perform a diagnosis exercise based at least in part on the discrepancy measurements to identify a cause of the fault, the diagnosis exercise comprising pre-determined robotic operations or randomly generated robotic operations.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

As used herein, "integrity" generally refers to a system functioning as intended according to an approved design. Loss of integrity may refer to deviation from expected behavior or an approved design. Loss of integrity may also be referred to herein as "fault". Fault may relate to both physical fault and operational fault. Physical fault may refer to fault in physical components of the robot, while operational fault may refer to fault in the operation of the robot.

As used herein, "fault monitoring" may generally refer to both the process of detecting faults in a robot and diagnosing the causes of a fault. Fault monitoring may also include removing, or correcting the detected fault, or adjusting the robot based on the fault.

Several factors may contribute to fault. These factors may include internal factors such as the control system and the physical components of the robot that may affect various functions of the robot, and external factors such as payload, force, temperature and various other environmental factors that may have, for example, transitory influences on the robot's operations and/or affect functions of the robot. Although control systems of robots may be characterized by fairly high complexity, the reliability and stability of the control system can be tested and ensured during the design process of the robot, employing various methods of detection including those present herein. In some cases, fault in the control system can be detected or examined during the design of the robot, so that when the robot is functioning in the field, the control system can be presumed to operate without fault, at least in so far as it operates the system and methods. The system and methods may also include consistency indicators that may usefully signal higher-level failures of control when triggered.

Figure 1:
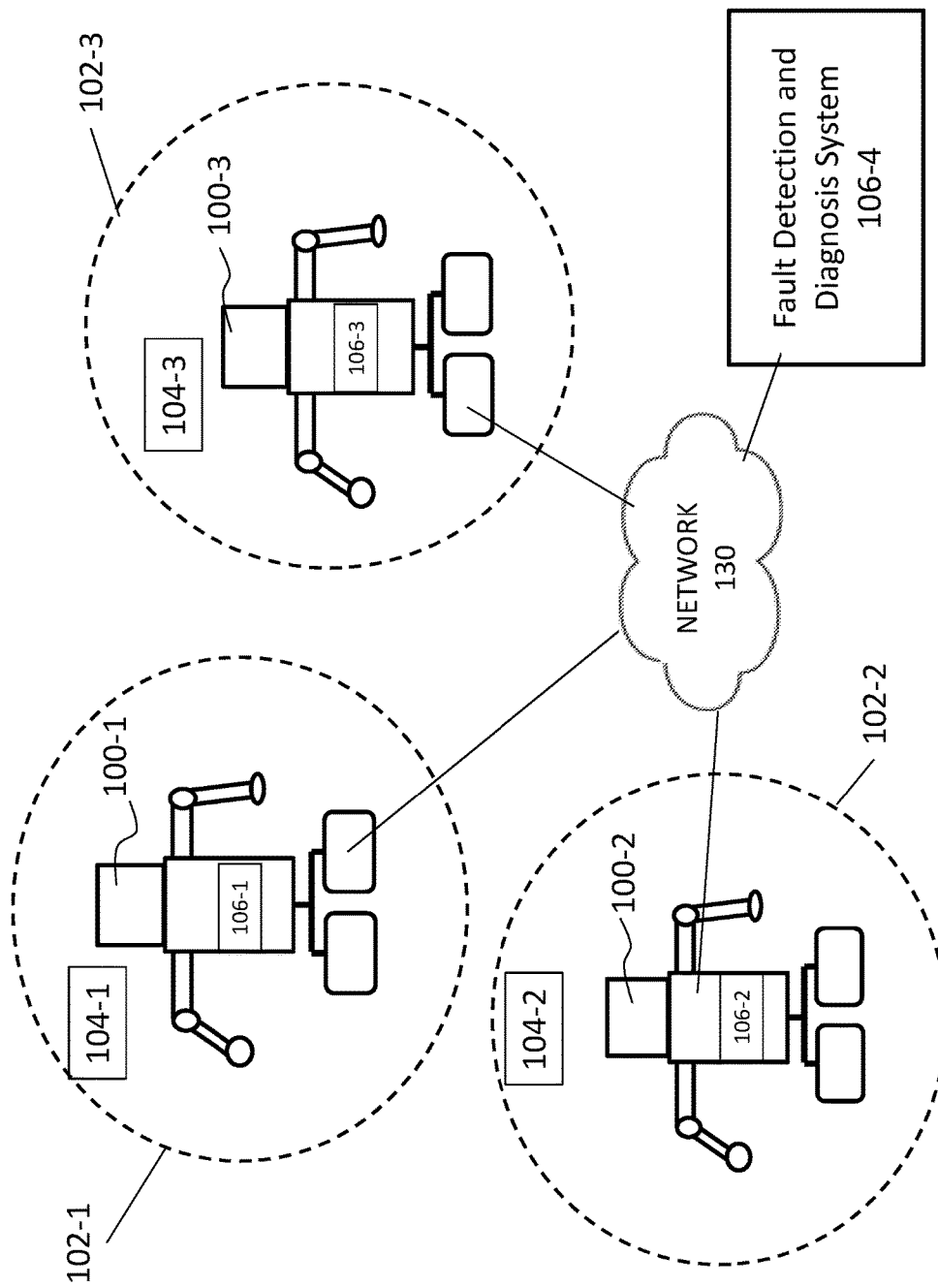
FIG. 1 illustrates an exemplary environment in which a plurality of robots and a fault detection and diagnosis system operate.

FIG. 1 illustrates an exemplary environment in which fault detection and diagnosis systems 106-1, 106-2, 106-3, 106-4 operate (collectively referred to as "106"). The fault detection and diagnosis system 106 can interact with one or more robots 100-1, 100-2, 100-3 (collectively may be referred to as "100"), and one or more sensors deployed in the environment 104-1, 104-2, 104-3 (collectively may be referred to as environment sensors "104") through one or more communication networks 130. The robots 100 may be operating in one or more different environments 102-1, 102-2, 102-3 (collectively referred to as "102").

The Fault Detection and Diagnosis system 106-1, 106-2, 106-3, 106-4 (the "FDD system" 106) may be configured to provide fault detection capabilities and also be enabled to determine causes for each detected fault of the robots 100. The FDD system 106 may comprise one or more processors and memories, and/or storage devices. The FDD system may interact with robots to obtain information regarding the current status and operations of the robot 100. The FDD system may also interact with the exteroceptive sensors (also referred to as external sensors herein) onboard the robot 100 and/or environment sensors 104 to obtain information regarding an environment 102.

In some embodiments, the FDD system 106-4 may be external to the robots 100 and may interact with one or more robots 100 to receive information from the robots (e.g., sensor data and other operational data), and/or provide data (e.g., status update, fault detection message, etc.) to them. The FDD system 106-4 may be part of a server farm, a cloud computing platform, a parallel computer, a personal computer, or any other devices with computing and storage capabilities. One or more displays may be provided, through which the FDD system administrators may view the data and/or interact with the system.

In other embodiments, the FDD system 106-1, 106-2, 106-3, may be part of the robots 100-1, 100-2, 100-3, and the FDD system may be configured to provide the robot with fault detection and diagnosis capabilities without requiring access to other external systems. The FDD system may also be installed on or attached to the robots 100. The FDD system may comprise one or more of software, hardware, or firmware, or any combination thereof. Alternatively, one or more functionalities of the FDD system may be performed by the robots 106-1, 106-2, 106-3, and the remaining functionalities may be performed by the FDD system external to the robots 106-4.

The robot 100 may be an autonomous robot. The robot may be a mobile robot. The robot may be a self-propelled robot. The robot may be capable of freely roaming about an environment 102. The robot may freely move along three dimensions or two dimensions. The robot may freely move over a surface or may be semi-restricted to certain areas or types of surfaces. The robot may freely roam over gravel, pavement, grass, sand, dirt, carpet, concrete floors, hardwood floors, or any other surfaces. The robot may be able to traverse transitions between different types of surfaces. The robot may comprise propulsion units or methods to enable it to move about the environment. For example, the propulsion unit may include wheels, rollers, legs, arms, propellers, rotors, or movable body surfaces. The robot may be capable of moving on its own without requiring the aid of a human or other living being. The robot may include internal or external sensors, which may be configured to obtain information or data regarding one or more aspects of the operation of the robot or its surroundings.

A plurality of robots 100-1, 100-2, 100-3 may interact with one another and collect data about one another via the network 130. For example, robot 100-1 may be malfunctioning, while robots 100-2 and 100-3 are in close proximity to the malfunctioning robot 100-1. Robots 100-2 and 100-3 may collect data about the environment 102-1 of the malfunctioning robot 100-1, and operation or performance data about the robot 100-1. In some embodiments, the collected data and information may be transmitted to a remote FDD system 106-4 to assist in detecting and/or diagnosing the fault of the malfunctioning robot 100-1. In other embodiments, data and information collected by robots 100 may be stored and processed by the respective robots (e.g., by their respective FDD systems 106-1, 106-2, 106-3), and the analysis results may be shared with other robots or the FDD system 106-4 external to the robots via the network or any other direct communication channels among the plurality of robots.

The plurality of robots 100 may or may not be located in the same environment 102. In some cases, the one or more robots may be located in different environments such as 102-1, 102-2, and 102-3. These environments 102 may be different in terms of one or more factors. For instance, they may have different temperatures, different ground surface (e.g., surface smoothness, topology, etc), noise, speed of wind, interactive objects in the environment and the like.

In some embodiments, environment sensors 104-1, 104-2, 104-3 may be deployed in their respective environments 102-1, 102-2, 102-3, and these sensors may be configured to collect environment data and collect data regarding the robots within the environment. The environment sensors 104 may represent a sensor array or a collection of sensors. The data collected by sensors onboard the robots and/or environment sensors may be used for detecting and/or diagnosing fault of the robots. The collected data may be used for one or more real-time simulations of an interaction between the robots and the environments. These environment sensors may be in communication with the robots and/or the FDD system 106. The environment sensors may include cameras, temperature sensors, humidity sensors, and any other sensor systems described herein. In some embodiments, the environment sensors may only be operational when a fault in a robot has been detected in order to increase energy efficiency by lowering power consumption.

The network 130 may be a communication pathway among the robots 100, the environment sensors 104, and the FDD system 106. Any of the communications provided herein may occur directly, for example, directly between two robots or between a single robot and its onboard sensors. Internal communication systems of the robot may comprise wired, wireless communication or communication over glass fiber. Alternatively, they may occur over the network 130, such as a local area network (LAN) or wide area network (WAN) such as the Internet. The networks may include links using technologies such as infrared, radio, Wi-Fi, point-to-point (P2P) communication, telecommunication networks, cloud communication, cellular network communication (e.g., LTE, 4G, etc) and the like. Optionally, relay stations, such as towers, satellites, or mobile stations, can be used. Various other wireless communication methods may be used. For example, Bluetooth (including various versions and its variants), Bluetooth Low Energy (BLE), Near-field communication (NFC) technologies may be used for communication between a robot and one or more other devices or robots. Wireless communications can be proximity dependent or proximity independent. In some embodiments, one or more types of communication techniques may be utilized. Various types of communication techniques may be used concurrently or exclusively. For example, wireless internet communication may be the primary communication, a secondary wireless network technology such as LTE or 4G may be used as a backup. In another example, in addition to the wireless communication network, the robot may also include a Global Positioning Systems (GPS) such that it can be tracked down or positioned when no network connection exists or the robot is not connected to one or more of the aforementioned communication networks. In addition, all or some links can be encrypted using conventional encryption technologies such as secure sockets layers (SSL), transport layer security (TLS), Internet Protocol security (IPsec), etc. In another embodiment, the entities on the network can use custom and/or dedicated data communications technologies instead of, or in addition to, the ones described above.

Figure 2:
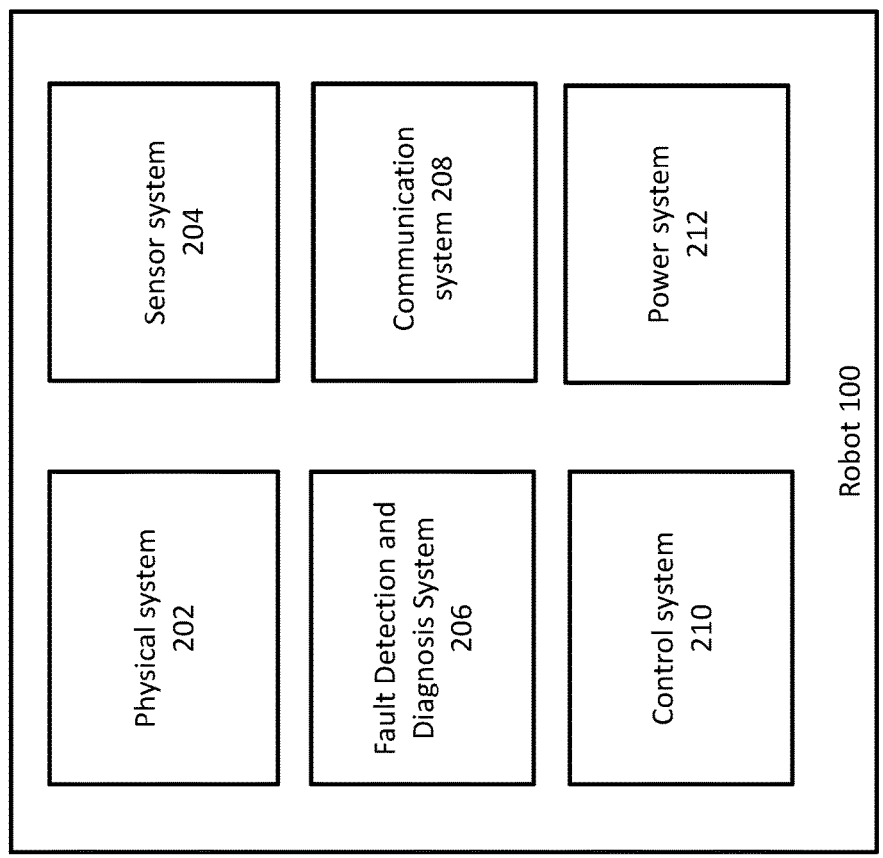
FIG. 2 illustrates exemplary systems of a robot.

FIG. 2 illustrates exemplary systems of a robot 100. The robot may comprise a physical system 202, sensor system 204, FDD system 206, communication system 208, control system 210, and power system 212. In some embodiments, one or more of the robot components may be custom designed for a specific robot or for a particular model or type of robot. In other embodiments, one or more of the robot components may be generic to many different robots and/or types of robots. The robot can include more systems or the various systems may be combined into fewer systems, as may be desirable for a particular implementation.

The physical system 202 may include all assembled physical parts (primarily structure) and their connections. This may include sinews, motors for exerting and transmitting force (e.g., electromechanical actuation devices), and other physical elements of the robot. The physical system may be configured to enable the robot to move about its environment 102 or interact with objects in its environment. The physical system may have modular parts which may or may not be removable and/or replaceable and/or upgradeable. The physical system may comprise modules and units as described previously such as propulsion units, driving units, and other components of the robot.

In some embodiments, the physical system 202 may include a plurality of components such as links (e.g., segments of arms and legs) that may permit the robot 100 to move and joints that may provide degrees of freedom for the segments of the robot. The arms of the robot may be capable of bearing load, picking up objects, and performing various other functions. In another example, the legs of the robot may permit the robot to move relative to an environment or maintain stability while standing. Various other components may be comprised for achieving dynamic and kinematic requirements of the robot. For instance, stabilization of the robot may be achieved with the aid of one or more stabilization platforms, such as gyroscopic platforms. The robotic joints may help the various parts of the robot to perform various kinds of movements. Different types of joints may exist, which include rotational, linear, twisting, orthogonal, and revolving joints. Various joints may, individually and in combination, provide various kinds of movements for the robot. For example, the robot may be capable of making any combination of translational or rotational movements.

The physical system 202 of the robot 100 may comprise a constellation of joints, rigid and flexible elements of structure, motors and agents of force, and design features to qualify as a humanoid robot and function physically in human-like ways. In some embodiments, such humanoid robots may qualify as androids, which may refer to robots built to aesthetically resemble humans. In some embodiments, only certain parts of the robot apparatus may resemble the human body. For example, the humanoid robots may model a human from the waist up or may replicate human facial features such as eyes or mouth.

The physical system 202 may also comprise one or more driving units. The driving units are configured to drive the propulsion unit. For example, a motor, engine, drive train, or any other component may be provided that may aid in driving the propulsion of the robot. The physical elements of the sensor system 204 and power system 212 may also be included, in, or be part of, the physical system 202.

The sensor system 204 of the robot 100 may be configured to obtain data or information regarding the robot's operation and its surrounding environment. The sensor system 204 may comprise a plurality of sensors. The plurality of sensors may include internal sensors and exteroceptive sensors. In some cases, the internal sensors may comprise proprioceptive sensors of movement and balance and interoceptive sensors of internal conditions such as temperature and stress. In some cases, the internal sensors may refer to sensors used by the control system 210 and/or the FDD system 206 of the robot for various robotic operations or monitoring operational states of the robot. For instance, the internal sensors may include location sensors, position sensors, motion sensors, strain sensors, force sensors, balance and orientation sensors, proximity sensors, acceleration sensors and the like for measuring and controlling the dynamics and kinematics of the robot. The exteroceptive sensors may refer to the vision sensors, distance-measuring sensors, auditory sensors, olfactory and taste sensors, and touch sensors that measure pressure, impact, friction, and/or texture; and also serve as payload sensors of the robot. The exteroceptive sensors may be used for sensing an environment of the robot or for specific missions of the robot. Details regarding the internal and exteroceptive sensors are discussed with respect to FIG. 3.

The Fault Detection and Diagnosis System 206 may interact with the physical system 202, the sensor system 204, the communication system 208, the control system 210, and the power system 212 in order to provide the robot 100 with capabilities to detect fault and generate accurate diagnosis based on the detected fault. The FDD system may also be configured to provide recovery procedures for the detected faults. The FDD system may comprise one or more processors, software, firmware, hardware, and/or storage devices. Specific functionalities of the FDD system are further described in FIG. 3.

The communication system 208 may comprise an internal communication system and an external communication system. The internal communication system may include internal networks of communication among various functional units, modules, or systems. External communication systems may be configured to handle communication or interaction with humans including voice, facial expression, gesture, body language and visual displays, and external communications with other robots and robot support as well as other forms of external communication, including wired or wireless communication (e.g., Wi-Fi, Bluetooth, NFC) methods. For example, the communication system 208 may be configured to interact with external databases to receive or transmit data relevant for the various functionalities described herein.

In some embodiments, the communication system 208 may provide communication between the robot and the FDD system 106-4. The communication system 208 may also provide communication between any two robots or among multiple robots 100. In some instances, communication may occur between the robot and third party devices, such as a security system of an environment 102 being patrolled by the robot, or mobile devices of individuals within the environment or related to the environment. Any communications provided herein may be two-way communications. Alternatively, some one-way communications may be provided (e.g., only from the robot to an external device, or from an external device to the robot). In other embodiments, the communication system 208 may provide communication between other systems of the robot 100 and the FDD systems internal to the robot 106-1, 106-2, 106-3.

The control system 210 may include one or more processors, data storage and networking devices, linked by internal communication networks. The control system 210 may interact with the physical system 202, the sensor system 204, the FDD system 206, the communication system 208, and the power system 212. The control system may be configured to provide information processing and data processing functionalities for the robot 100, and interact with the FDD system to provide one or more information processing capabilities to the FDD system for fault detection and diagnosis purposes, or other fault monitoring related purposes. The control system 210 may be positioned at one or more locations, which may be internal to a robot and/or external. Elements of the control system 210 dedicated to robots may operate independently for each robot and/or may operate jointly across multiple robots. In another example, one or more aspects of the control system may be decentralized within a robot across various nodes of concentration and beyond to a plurality of points where a sensor exists and/or power is activated. In other examples, one or more components of the control system may be part of a cloud computing system, or offloaded onto a separate processing unit remote from the robot. For example, data storage and computational devices may be accessible via the network 130.

The control system 210 may also include one or more processors that may perform one or more operations in accordance with non-transitory computer readable media that may define operation of the robot. The processor may determine, based on data, how the robot should operate (e.g., move in its environment, collect data, communicate with other devices or systems, provide alerts, control display, and interact with individuals or its environment). The processor may make this determination in accordance with data collected by the robot, wherein the data may be received from the FDD system 206, sensor system 204 and/or received from any other sources. In some embodiments, the data may be received directly from other robots in the environment or other robots in the vicinity, via wired or wireless communication channels or networks 130.

The control system 210 may have one or more memory units that may include non-transitory computer readable media that may comprise code, logic, or instructions for performing the one or more operations. For example, transitory computer readable media having algorithms for analyzing a state of the robot may be provided on-board the robot and accessed by one or more processors of the control system. Algorithms for analyzing some of the collected data may also be provided on-board. The memory may store data collected by the sensors of the robot. In some embodiments, a control system may use data collected by the robot in order to determine the state of the robot and/or determine the next acts of the robot. The control system may also optionally include data from external data sources, such as one or more servers, on-site data sources, static data sources, other robots, or social media data sources.

The power system 212 may include one or more power supplies, which may be used to power the robot 100. A power supply may be an energy storage device, such as one or more batteries. The batteries may be rechargeable batteries (i.e. secondary batteries). Batteries having any battery chemistry known or later developed in the art may be used. In some instances, batteries may be lead acid batteries, valve regulated lead acid batteries (e.g., gel batteries, absorbed glass mat batteries), nickel-cadmium (NiCd) batteries, nickel-zinc (NiZn) batteries, nickel metal hydride (NiMH) batteries, or lithium-ion (Li-ion) batteries. The one or more power supplies may power one or more components of the robot. The power supplies may be used to power propulsion of the robot, such as one or more motors that power the movement of one or more arms and legs of the robot. The power supplies may power any other components of the robot, such as one or more sensors, communication unit, control system, memory, and/or display/audio unit. The same power supply may be used for multiple components, or different power supplies may be used for different components. Batteries may also be exchanged or swapped out. The control system 210 of the robot may examine or analyze the status of one or more batteries and may provide an instruction for the robot to recharge, exchange, or swap out one or more batteries.

Fault Detection and Diagnosis System

Figure 3:
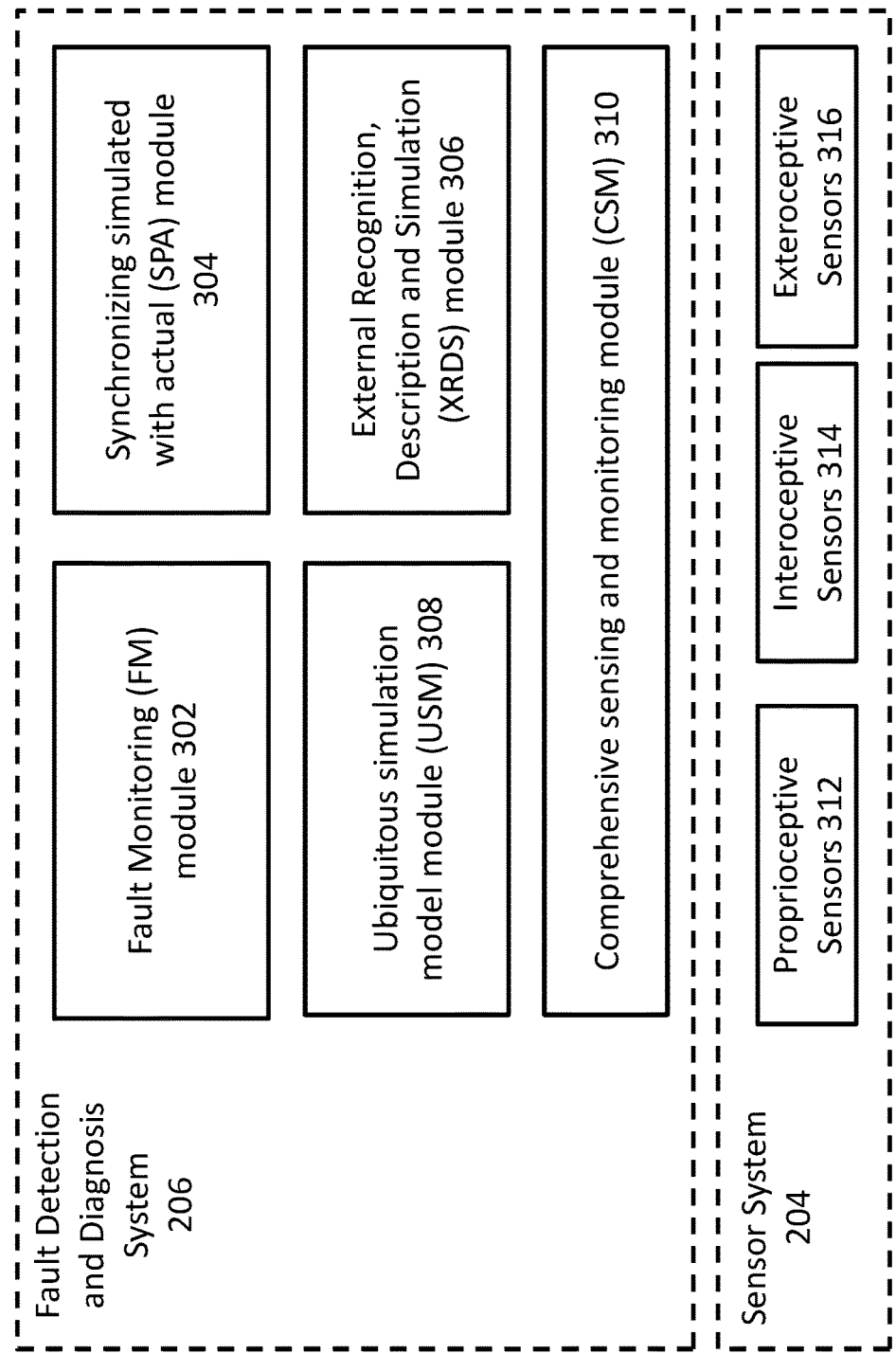
FIG. 3 illustrates components of a fault detection and diagnosis system of the robot.

FIG. 3 illustrates components of the FDD system 206 and the sensor system 204 of a robot. The FDD system may be configured to detect any fault of a robot, and provide further diagnosis of the fault. The FDD system may also be configured to provide instructions for the robot for recovery from any detected and diagnosed faults. The FDD system 206 may comprise a ubiquitous simulation model (USM) module 308, comprehensive sensing & monitoring (CSM) module 310, fault monitoring (FM) module 302, external recognition, description, and simulation (XRDS) module 306, and synchronizing simulated with actual (SPA) module 304.

These components or modules of the FDD system 206 are generally functional components that can generate useful data or other output using specific input(s). The components can be implemented as general or specific-purpose hardware, software, firmware (or any combination thereof) components. A component may or may not be self-contained. Depending upon implementation-specific or other considerations, the components may be centralized or distributed functionally or physically. Although a particular number of components are shown in FIG. 3, the FDD system 206 can include more components or can combine the components into fewer components (such as a single component), as may be desirable for a particular implementation. The interactions among these components are illustrated in detail below.

Referring to FIG. 3, the robot's USM module 308 may be configured to provide simulations of one or more of the robot's modules, systems, and their operations. The USM module may also store, update, and/or have access to simulation models, which describe (e.g., mathematical, model-based description) all of the robot's components, as well as the interaction of their individual functioning that generates the robot's various actions and activities. Moreover, the USM module may be configured to enable the robot to fully describe both its nominal present state and simulate its future state in order to calculate appropriate actions. Nominal present state may refer to the expected current state according to the original design of the robot. For example, this calculation may be based on the robot's prior status and recent activities or actions. The USM module may comprise and/or interact with one or more databases associated with the module in order to store, update, and/or provide access to the models.

The USM module 308 may be configured to store and/or update the models of the individual components and modules of the physical system 202 of the robot, and may also include functional models of one or more different modular parts of the physical system (e.g., the physical system 202, sensor system 204 and power system 212) and the interactions among them. The models may include mathematical equations based on first principles, which may refer to models based on known physical factors that may influence the robot or its movement and operation. The models may include the kinematics of the robot 100, which may, for example, describe how the motion of the joints of a robot can be related to the motion of the rigid bodies that makes up the robot. The models may also include the dynamics of the various robot body parts. The models can be used to predict or calculate an output performance of the robot according to an input data. For example, the flexing of the robot's elbow joints may be modeled in terms of the forces exerted by various active components or systems of the robot such as motors or contractile connections, frictional resistance experienced at startup and at various paces of movement, and other forces such as the force of gravity and accelerating forces transmitted through the shoulder or forearm. In another instance, the models may enable exact description of the effects of factors such as the change in temperature or wear and tear on frictional resistance, the effect of bumping into some external object, or the effect of a failing structural element upon the strength of a joint.

The USM module 308 may include models with mathematical descriptions of various components of the robot. For example, the models may include sensor models at an individual component level, and also include kinematics models of the movement associated with various parts of the robot and the like, and may also integrate these two classes of models in order to interpret visual information received while the robot's visual sensors are moving. For example, rotation matrix derived from the kinematics models may be applied to the camera coordinates and/or motion vectors may be tracked to correct undesired optical effect (e.g., optical distortion due to motion of the camera).

The USM module may store, update, and/or provide access to models (e.g. simulation models) for various sensors onboard the robot 100. For instance, models for accelerometers and gyroscopes of inertial measurements units (IMUs) may be provided. Such models may enable the USM module to calculate output results based on the supplied input data.

The kinematics models can typically include information about action commands or instructions given to a robot. As part of the model, the kinematics of the robot can be included, which can help improve estimates of sensing under conditions of inherent and ambient noise. The dynamic model balances the contributions from various sensors, and various partial error models, and can generate a probabilistic model regarding the location and orientation of the robot. For 2D robots, the kinematics may typically be given by a mixture of rotation and "move forward" commands, which may be implemented with additional motor noise. For example, the distribution formed by independent noise in angular and linear directions can often be approximated by a Gaussian distribution. In some cases, the models may be stand-alone models (e.g. sensor model, motor control model), which can be created independent of any specific robot designs. In other cases, the models may be robot specific (e.g., kinematic model) that are related to the specific design of the robot.

The models stored or accessible by the USM module 308 may serve the basis for computing the robot's physical and sensor operations. For instance, the models serve to calculate how various actions by the robot's motors and other sources of power can affect the present movements and accelerations of the various robot parts. The USM module may be updated and adjusted based on any replacements, upgrades or updates to the robot's components.

The simulation process in the USM module 308 may use a series of sensor observations over discrete time steps and compute an estimate of the robot's location, motion, and various performances. Statistical techniques used in developing the USM simulation models and/or assessing errors of the robot or model itself may include Kalman filters, particle filters (a/k/a Monte Carlo methods), scan matching of range data and the like.

The Comprehensive Sensing and Monitoring (CSM) module 310 may provide the robot with timely sensor information about itself and its environment, by equipping the robot with both comprehensive sensing and comprehensive monitoring abilities. The CSM module 310 may be communicatively coupled to the sensor system 204, and may be configured to obtain one or more of the proprioceptive sensor data 312, interoceptive sensor data 314, and exteroceptive sensor data 316.

Comprehensive sensing may be accomplished by continually monitoring—in real-time or near-real-time—sensor data required to achieve the robot's performance targets. The performance targets may be established by design, and/or configured manually by an operator or automatically according to various operational objectives of the robot 100. For example, the robot may be designed for a specific task (e.g., detecting specific items) or the operator may update the commands or objectives of the robot via wireless or wired updates, which may alter the performance targets for the robot. Sensor data may be collected for i) monitoring fault, ii) determining the robot's current status in its environment, iii) recognizing and describing internal anomalies and external factors and objects, iv) supporting learning (e.g., updating of models) through experience in such forms as innovating new modes of action, v) adjusting action commands to match the robot's special qualities, and vi) communicating with humans or non-humans (e.g., other robots) regarding its tasks and objectives. The CSM module may be configured to configure various settings related to the collection of sensor information. For example, the CSM module may be configured to adjust the degrees of resolution, sensitivity, accuracy, and speed of response of various sensor systems of the robot, based on the objectives of the task.

The CSM module 310 may be configured to provide comprehensive monitoring, which may refer to receiving sensor information and data in a timely manner, integrating data received from the various sensors, analyzing the integrated data to extract information relevant to the robot's goals, and performing these functions with coverage of detail, timeliness and precision that suffice to accomplish the robot's goals. The extracted information may also be used to update the robot's status, identify significant unforeseen or non-configured external events, or discover internal anomalies indicative of fault.

The sensor information to be utilized by the CSM module 310 may be collected through various categories of sensing functions such as proprioceptive, interoceptive, and exteroceptive sensing. Such collected data may be compared with the predictions generated by the USM module 308. The simulations calculated by the USM module may be conducted with sufficient timeliness, accuracy, relevance, and precision to provide a reliable context within which significant discrepancies between the predicted and the actual sensor information may be analyzed. Discrepancies between predicted and actual sensor information may indicate either an anomaly in internal function, or unexpected external events, stimulations, or objects, or a combination of both. The sensor information may also provide the robot with the knowledge of its place in the environment (e.g., localization and mapping) that is required for calculating its activities.

The proprioceptive sensors 312 may be used by the robot to sense its body position, acceleration and velocity, various static and dynamic loads on the robotic apparatus due to its position and movement, and its resulting state of balance. For example, proprioceptive sensing may involve perceiving or measuring position, motion, acceleration, stress, balance and the like. For example, proprioceptive sensing may involve Global Positioning Systems (GPS) or Inertial Navigation System (INS) sensors. In some instances, a combination of the GPS and inertial measurement unit (IMU) may be used to aid in the navigation and/or movement of the robot in its environment. The navigation system can utilize any suitable GPS technology, such as differential GPS (DGPS) or real time kinematic (RTK) GPS. In some instances, an IMU may also aid in the navigation of the robot. An IMU can include one or more accelerometers, one or more gyroscopes, one or more magnetometers, or suitable combinations thereof. For example, the IMU can include up to three orthogonal accelerometers to measure linear acceleration of the movable object along up to three axes of translation, and up to three orthogonal gyroscopes to measure the angular acceleration about up to three axes of rotation. The IMU may be provided exterior to or within a housing of the robot. The IMU can provide a signal indicative of the motion of the robot, such as a position, orientation, velocity, and/or acceleration (e.g., with respect to one, two, or three axes of translation, and/or one, two, or three axes of rotation). For example, the IMU can sense a signal representative of the acceleration of the robot, and the signal can be integrated once to provide velocity information, and twice to provide location and/or orientation information.

The IMU may provide a signal to a control system of the robot. Alternatively, the IMU may provide a signal that is combined with other CSM module 310 information to calculate and provide signals to the control system of the robot. For example, proprioceptive sensors may be utilized to calculate, i) the position, movement, and acceleration of the robot's mechanical parts; ii) the robot's weight and distribution of its mass; iii) balance; iv) orientation in three dimensions; v) stress or load on its various parts (e.g., when it is carrying or lifting an object). Such measurements may inform the robot of its status as it interacts in the external world, and are helpful for optimal control of its movements.

The interoceptive sensors 314 may be configured to perform interoceptive sensing. Interoceptive sensing may involve measuring the internal state of a robotic apparatus, which may include weight, energy level, temperature, electric current, electro-magnetic fields, and the like. In some instances, the robot may be able to sense a situation in which the robot may be damaged in the absence of human intervention. For example, a temperature sensor may pick up an unusual amount of heat within the robot, where the unusual overheating information may be provided to the control system onboard the robot and/or the FDD system 206 for diagnosing a fault. One or more external sensors in the environment may also be involved in collecting information to detect whether or not there may be damage to the robot (e.g., detecting higher than normal temperatures via infrared sensors). In some embodiments, the one or more external sensors may include exteroceptive sensors. The term "external sensors", for example, may be used to refer to sensors that reside onboard the robot or are attached to the exterior of the robot. Other robots in the vicinity may also be able to detect unusual conditions in the target robot, and may be configured to transmit relevant information to the target robot or the FDD system 206 for diagnosis and analysis.

The exteroceptive sensors 316 may be configured to perform exteroceptive sensing. Exteroceptive sensing may involve measuring external sensors including analogues for both human senses—sight, hearing, smell, taste, touch—and non-human capabilities. Sensors capable of exteroceptive sensing may include contact sensors, range sensors, and vision sensors. Contact sensors may be used to detect contact between two parts or with a foreign object (i.e., an external object that is known or potentially unknown), while range sensors may be used to measure the distance to objects in a robot's operation area, or the distance between the location of a sensor and another location in the body. Range sensors may also be used for robot navigation or obstacle avoidance. The exteroceptive sensors may be capable of performing optical character recognition, omnidirectional imaging, thermal imaging, sound collection through microphones, ultrasonic sensing, infrared sensing, light detection and ranging (LIDAR), air quality assessment, weather and other environmental sensing including barometric pressure, wind pressure, wind speed, temperature, humidity, pollution, smoke, $CO_2$, noise, sensing of radiation, chemical and biological agents or hazards, sensing of electromagnetic radiation, sensing presence and identity of radio, cellular or wireless devices and the like.

Sensor validation

Analyzing and diagnosing the physical components and systems of the robot 100 may depend on adequate and accurate internal sensors (i.e., proprioceptive and interoceptive sensors) and exteroceptive sensors. In one embodiment, the robot's sensor system 204 may be validated through authentication by confirming that individually or collectively, the sensors yield a known or verifiable value. For example, internal sensors may be authenticated when they match the predicted values simulated according to stored sensor models (e.g., simulation by the USM module 308). A proprioceptive sensor or an interoceptive sensor for electric current may be validated when real-time sensor measurements match simulated values during physical exercise.

The Fault Monitoring (FM) module 302 may be configured to detect any discrepancies between simulation data and real-time or near real-time sensor data. The FM module may be configured to control the process of processing and integrating data relevant to the possibility of fault, analyzing suggestive data, determining a probable fault, detecting specific evidence of a fault, analyzing the fault, and further determining an accurate cause for the fault. The FM module may interact with the USM module 308, the SPA module 304, the CSM module 310, and the XRDS module 306 to provide such functionality. For example, the FM module may interact with the USM module 308 and the CSM module 310 to respectively collect simulation data and sensor data. In some embodiments, if the FM module detects any discrepancy between the simulation (data obtained from the USM module 308) and sensor data (data obtained from the CSM module 310), the FM module may be configured to indicate or alert the detection of fault or a determination of a discrepancy to other modules in the system. For example, the USM module 308, CSM module 310, and the SPA module 304 may be alerted to the fault detected by the FM module or the discrepancy under analysis by the FM module.

The FM module 302 may be configured to obtain information associated with the detected fault. The information to be obtained may be based on a discrepancy or pattern of discrepancies that has been determined. For example, once fault is detected, the FM module may interact with one or more databases associated with the FM module, in order to obtain diagnosis methods related to the specific fault. If the detected fault concerns the arm joints of the robot, the FM module may be configured to obtain information regarding the diagnosis methods to analyze the causes of fault concerning the arm joints. The mapping between detected faults and various diagnosis methods may be updated by the FDD system 206. In some embodiments, the updates may be based on whether or not the diagnosis method applied for the detected fault accurately accounts for and/or resolves the fault. The association between the detected fault and the diagnosis methods may be strengthened or weakened based on the outcome of the diagnosis, and the parameters controlling the association may be tweaked or updated by the FDD system.

The Synchronizing Simulated with Actual (SPA) module 304 may be configured to synchronize simulation data from the USM module 308 with the actual sensor data from the CSM module 310. The SPA module may interact with the FM module 302 to obtain current status of the robot 100. For example, the SPA module may be alerted of a fault detected by the FM module 302. In some embodiments, the SPA module 304 can increase the calculation speed of the FDD system 206 and/or aid the USM module 308 to efficiently and rapidly isolate a fault and adjust for its impact and/or help to improve the resolution of the CSM module 310.

The External Recognition, Description and Simulation (XRDS) module 306 may be configured to build the robot's 100 representation of the external environment 102 and/or extend the functionality of other modules to take into account external influences. For example, the XRDS module may interact with the USM module 308 to extend its simulation capabilities. The XRDS module may be configured to i) recognize various objects and/or ii) build models to describe the recognized objects. The XRDS module may interact with one or more databases associated with the XRDS module in order to store/update/retrieve data and models regarding external environments and objects.

The XRDS module 306 may be configured to interact with CSM module 310 to obtain data regarding the environment and any surrounding objects. The XRDS module may be configured to categorize and distinguish various objects by comparing the obtained sensor data to the stored data in databases associated with the XRDS module. The first process may involve recognition, which may refer to the capability of the XRDS module to recognize the category of the particular object of interest. For example, the XRDS module may be able to "recognize" that the external object is a "ball", based on fundamental features extracted from the sensor information (e.g., the external object may have a spherical shape). Once the XRDS module recognizes the object, the module may be configured to further "describe" the object, which may refer to the process of obtaining data points for relevant features of that particular category of objects. For example, a "ball" may have various general features (e.g., velocity, position, direction and rotation) and specific features, including the radius, weight, color, material, bounciness, and the like. The XRDS module may be configured to further collect information on each feature, if possible, to better "describe" the external object.

In some embodiments, the XRDS module may continue to update and improve its understanding of external objects by continuing to monitor CSM data and/or interacting with the external objects, and updating one or more data points on various features regarding the external objects. Some features may not have been previously associated with the category of object, but may be included based on the robot's interaction with the external object.

In some instances, when a robot 100 is impacted by and responds to external forces or conditions, the robot may lack a complete or precise simulation model of the phenomena that affects it. The robot 100 must rely on exteroceptive sensors and/or environment sensors 104 to collect data regarding the environment in order for the robot to recognize distinct external objects.

The robot 100 may be operating in an environment 102 where no unknown external factors influence the robot, in which case the XRDS module 306 may be configured to simulate known external factors such as, for example, the gravitational force, or other known objects in the room or observable/known irregularities on the floor surface. In this scenario, the USM module 308 may incorporate any known external factors from the XRDS module, for example, by adjusting the output of the USM module simulation results according to the known external factors. Any significant discrepancy in the modified simulation and the sensor measurements may indicate the likely existence of an anomaly.

The robot 100 may also experience imperfectly known or unknown external factors or events, and the simulation process (e.g., simulation by the XRDS module 306 or the USM module 308) may be extended to accommodate imperfectly known or unknown external influences. In some embodiments, when unknown external factors are present the robot may automatically switch into an "extension mode", which may involve adjusting for previously unknown external influences. In some embodiments, the robot may undergo self-evaluation to detect any fault, before switching into the extension mode to account or adjust for unknown external influences. This may be necessary to isolate the cause of any potential influence to unknown external factors.

The five modules, USM 308, CSM 310, SPA 304, XRDS 306 and FM 302 are described here in terms of their roles in fault detection and diagnosis. An advantage of this approach is that the first four modules can, in addition to supporting FM, fulfill general purposes and serve as core components of a robot's operating control systems.

Figure 4:
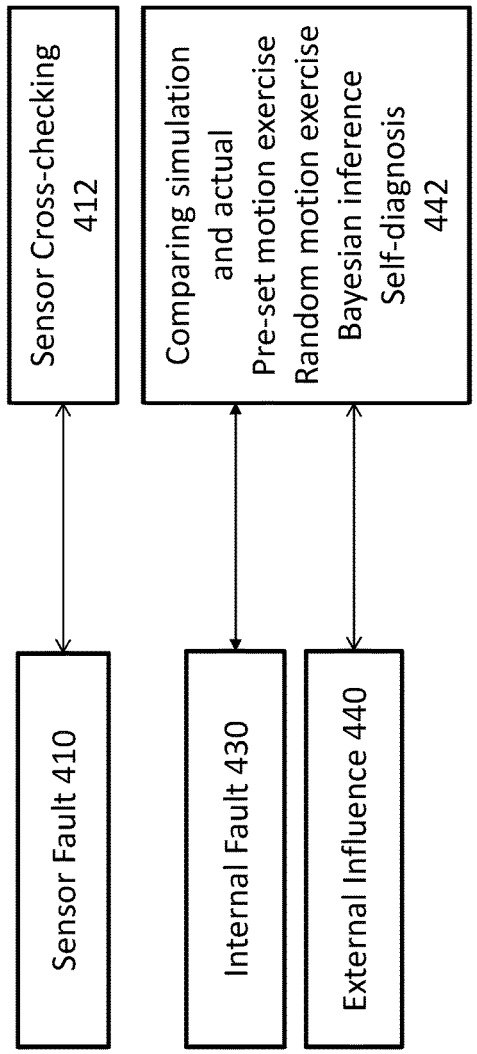
FIG. 4 illustrates types of fault detection and an exemplary set of corresponding diagnosis methods.

FIG. 4 illustrates types of fault detection and an exemplary set of diagnosis methods. The FDD system 206 may be configured to provide the robot 100 with a set of diagnosis methods for each fault detected. Faults may be associated with various modules, components, or systems of the robot. For example, the sensor systems 204 may be malfunctioning and require validation, or the physical system 202 of the robot may be malfunctioning. Once the FDD system 206 detects any symptoms of a likely fault, the FDD system 206 may obtain diagnosis methods according to the detected symptoms or likely nature of the fault. In some instances, isolating the cause as relating to either the sensor system 204 or the physical system 202 may be an early stage in diagnosis.

The sensor system can be critical for all operations of the robot 100, including the FDD system 206. In some instances, the sensor system 204 of the robot may experience failure (sensor fault 410). The FDD system 206 may obtain diagnosis methods which involve various sensor validation methods. Internal fault 430 and external influence 440 can be examined using methods including comparing simulation results with actual measured sensor outputs, pre-set or randomized diagnostic exercises, Bayesian inference, self-diagnosis and the like, or any combination thereof (collectively referred to as 442). Exercises, as used herein, may generally refer to any robotic movements or motions. Exercises, for example, may serve to further demonstrate the nature of the fault and/or obtain further sensor data concerning the fault.

Regarding sensor validation, a set of sensors and a set of relationships among them may form a network of cross-checks (412) which can be used to periodically validate all of the sensors in the network. On the hardware side, various techniques, including duplex, triplex, or higher hardware redundancy may be used. Analytical redundancy can also be used such that a sensor's value may be predicted by using values from other sensors, and applying known or empirically derived relations among different sensor values. A hybrid approach, combining both hardware and analytical redundancy may be used. Other validation algorithms can also be utilized for sensor validation. Sensor validation can be conducted in real-time or near real-time. The sensor validation operation may be performed prior to initiating other elements of the fault diagnosis process.

Physical Exercise

Figure 5:
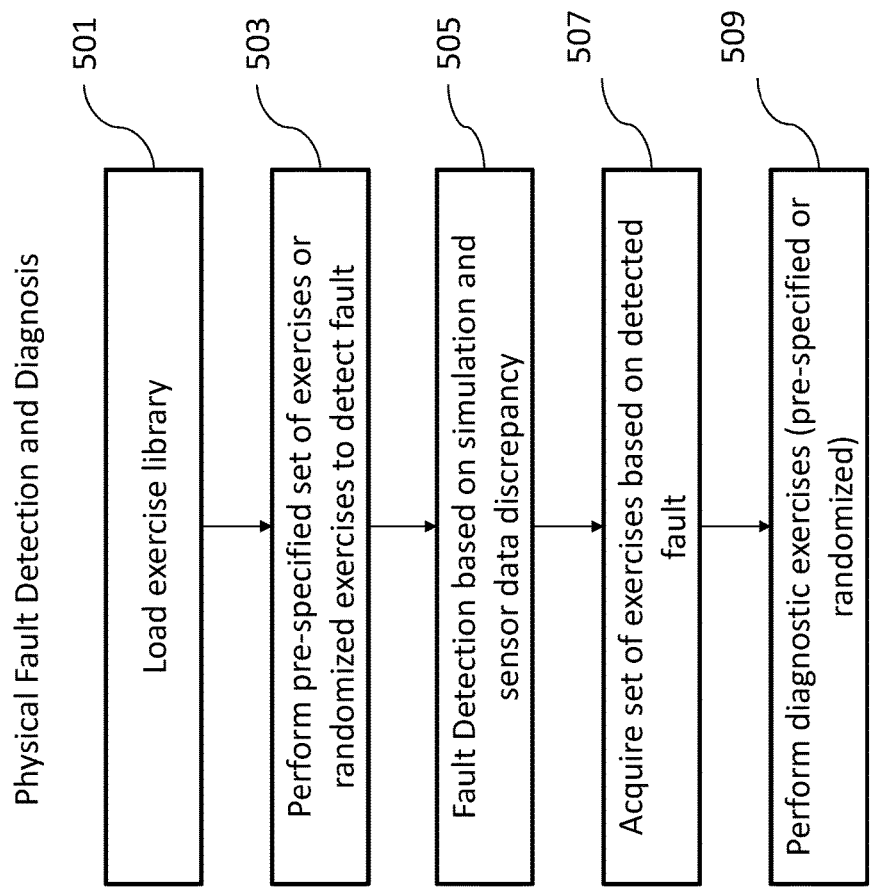
FIG. 5 illustrates methods for detecting and diagnosing physical fault.

In some embodiments, the robot 100 may be instructed to conduct a series of exercises (e.g., fault monitoring exercises) to detect physical fault and provide diagnosis regarding any fault. The actual performance of the robot may be compared to nominal performance measurements during the exercises in order to detect any discrepancy indicative of fault. Actual performance may be measured throughout the exercises by the CSM module 310. Nominal performance may be calculated by the USM module 308 throughout or during the exercises, or may be included in the specifications of each exercise. FIG. 5 illustrates a method of detecting and diagnosing physical faults in the robot. When the robot is performing testing movements, malfunctions or flaws of various physical modules and components of the robot may be examined including, but not limited to sensors, communication units, motors, driving units, propulsion units and the like. The robot can detect fault preventively by performing these specialized exercises (i.e., fault detection exercises) designed to test the nominal capabilities of the robot and detect potential anomalies. These exercises can be performed regularly, for instance, on a daily basis. Alternatively, these exercises can be performed in response to an event. The exercises may be categorized into fault detection exercises and diagnostic exercises. The fault detection exercises may be exercises optimized to detect fault in various regions of the robot. The diagnostic exercises may be exercises optimized to diagnose fault once a specific fault has been detected. In some embodiments, fault detection may or may not involve exercises, but may be based on detected signals or probabilistic analysis.

At operation 501, the robot 100 and its FDD system 206 may be configured to load the exercise library from one or more of its associated databases. The exercise library may include fault detection exercises and fault diagnostic exercises. The fault detection exercises may include a pre-determined set of exercises and/or randomly generated exercise.

At operation 503, the robot 100 may be configured to perform a pre-specified set of exercises or a set of randomly generated exercises for the purposes of detecting fault. The fault detection exercise routine can be a regular exercise, scheduled for a pre-set time interval (e.g., daily, weekly basis) to verify the condition of the robot. The pre-determined exercise routine may also be performed at random time intervals during periods when the robot is idle. The pre-determined set of exercises may also be performed whenever there is any reason to believe that the robot may have a fault.

The fault detection exercises of the robot 100 may also include randomly generated exercises. A set of exercises may be randomly selected from a universe of possible exercises based on criteria that respond to both the potential significance and the probabilities of potential flaws. A set of randomly selected exercises may also be placed in randomized order according to criteria that favor sequences that can potentially disclose rare but serious issues. Such spontaneous exercises emphasize likely and/or significant faults and focus on irregularities that might disclose rare conditions including the effects of tampering. When the robot is performing random testing movements, nominal performance may be calculated based on the USM module 308 simulations during the random exercise, and there may be no pre-specified values based on prior calculations. The random movements may be useful, for example, when the possibility of tampering by an unknown adversary is taken into account. The random movements may be generated based on various possible situations or hypotheses. In some cases, when a potential source of fault is known, the random testing movements may be selected to test aspects related to or associated with that known fault. Alternatively, if the source of fault is not known, the FDD system 206 may be configured to directly move to the diagnosis phase. Similarly, when the robot has experienced an accident, the testing movement may be selected by focusing on the potential damage from the accident. Taking into account both the Bayesian probabilities for various kinds of flaws and the significance and risk attached to those various flaws, these testing exercises can (1) maximize the expected benefit of test exercises by emphasizing likely and/or significant faults, while (2) randomizing the forms, sequences and combinations of test exercises so as to check for interactions or interdependencies between exercises. By randomizing test movements and/or the sequence of test movements, potential bias or errors in measurements due to the specific order in which testing movements are performed may be minimized.

The fault detection exercises may have nominal performance measurements that are pre-specified based on prior calculations. In some embodiments, if no prior calculations are available, the simulations may also take into account Bayesian probabilities related to the potential faults. In other embodiments, at operation 505, actual sensor measurements during the exercises may be compared with nominal values and alternatively with currently calculated expected values based on simulation results of the USM module 308 if the latter differ from the nominal values. Fault may be detected when the comparison between actual values and the nominal or simulation values—as appropriate based on given conditions and circumstances—yields a discrepancy greater than a pre-specified limit. The pre-specified limit may be determined during the design phase of the robot or may be configured later during the operations of the robot. In some embodiments, the limit may take into account Bayesian probabilities related to the potential flaws.

In some embodiments, fault detection may not involve fault detection exercises. Whenever a single discrepancy or an episode of successive discrepancies occurs, the probability of fault can be assessed by Bayesian methods. A comprehensive and concise history of past anomalies, accompanied by the contexts in which they occurred, is retained in databases, which are either onboard the robot 100 or accessible via the network 130. Present discrepancies can be immediately or rapidly analyzed—in real-time or near real-time—in light of past patterns, and this analysis may be further enriched as ongoing information continues to arrive in subsequent moments. The framework for this analysis is the current operating status of the robot—the actions underway and the contexts in which they are being undertaken.

Next, once a discrepancy has been associated with some component and/or activity of the robot 100, the next operation may involve a diagnosis phase. The diagnosis phase may involve the robot and its FDD system 206 acquiring or accessing diagnostic exercises associated with the detected fault (operation 507). The diagnostic exercises may be stored in one or more databases associated with the FDD system 206. For example, the FDD system 206 may obtain diagnostic exercises from a diagnostic exercises library. Alternatively or in parallel, the FDD system 206 may also obtain a set of exercises from a database external to the robot 100 via the network 130. The diagnostic exercises may involve exercising one or more specific components (e.g., retrieving exercises to diagnose and/or analyze a particular component) or engaging in a certain activity deliberately in order to evoke and magnify the detected anomaly in a repeatable way. Further exercises may be included to evoke the discrepancy to identify the underlying issue and quantify its severity.

At operation 509, the exercises obtained by the robot and/or the FDD system 206 may be performed. In some instances, a suitable subset of the exercises can be repeated to aid in diagnosis. Ad-hoc exercises can be configured for maximum sensitivity to likely causes, and evaluated by comparison with simulated values. For example, in the case of a stiff joint, a natural way to probe the problem may be to apply a very small initial force and then gradually increase the force until the joint first budges. In another example, a sine frequency sweep may be applied to the actuation unit of the robotic system. The frequency response of the velocity of the robot arm may be analyzed. The stability of the particular component or the system may be examined. There are a variety of methods which can be used for identifying the stability of a robotic system. For example, overshoot of the amplitude response, phase margin, peak resonance, oscillation and the like may be examined to detect instability of the system. In some embodiments, the amplitude response at a peak resonance may be checked to see if it exceeds a safety value during a sine sweep process. For example, if excessive peak amplitude is detected at resonance frequency, it may be indicative of instability of the system.

The diagnostic exercises may include one or more exercises performable by the robot 100 (e.g., within the range of motion of the robot). In some embodiments, the exercises may include "dancing" and "jittering" exercises that serve to test and confirm a robot's physical systems including its physical condition, motors, control communications, sensors, or sensory communications. For example, fully-extending "dancing" exercises can provide diagnosis for structural faults or other faults in joints and the power system 212. Slow-moving and graceful motions validate the range and smoothness of motion of the robot and confirm appropriate balance and distribution of weight of the robot. Strength and stiffness are further validated by movements such as pressing limbs against one other, leaping and other weight-bearing movements. In a normal "dancing" session, the robot is taken through the full range of motion, stretching to the maximum in different positions to confirm strength and consistency of force and validate calculations of balance, strain and torque on the joints. These pre-determined movements may be designed to test the limit of the robot in terms of load bearing, motion range, dynamic range and all kinds of static and dynamic strains.

Quick back-and-forth "jittering" motions may give rise to vibrations in the robot's body that may be sensitive to the status of many facets of the robot's physical condition and sensory capabilities. Jittering motions may involve rapid cyclical fluctuations in direction or force of physical effort so as to evince regular vibrations. Jittering motions may put the entire body of the robot through rapid rhythmic movements, in order to detect and amplify unexpected or irregular patterns, and to determine if all of the body's elements are interoperating as intended. In a normal jittering session, pre-specified alterations in the direction and strength of forces reach throughout the body, and the resulting movements and accelerations, including particularly the frequency and magnitude of vibrations, are measured. Frequency and magnitude may be informative of the robot's status, and in addition the actual dynamic patterns of the body's response may be calculated in real time and analyzed for signs of underlying issues such as excess inertia or wobble. Various versions of these dancing and jittering exercises may also serve as routine preventive exercises for early detection of incipient faults that have not yet grown large enough to show up in ordinary activities. Such preventative exercises may be included, for example, in the evaluation of physical integrity 611 below.

The various testing exercises may be stored as a library in a database associated and/or interacting with the robot and its FDD system 206. Based on different robot types, functions and testing purposes, appropriate testing exercises may be selected. The library may be, for example, stored in a memory unit coupled to the FDD system 106-4 external to the robot as described in FIG. 1. Alternatively, the library may be part of the robot 106-1, 106-2, 106-3, or attached/installed/integrated into the robot 100, as described in FIG. 1. For example, the library may be part of the control system 210.

Figure 6:
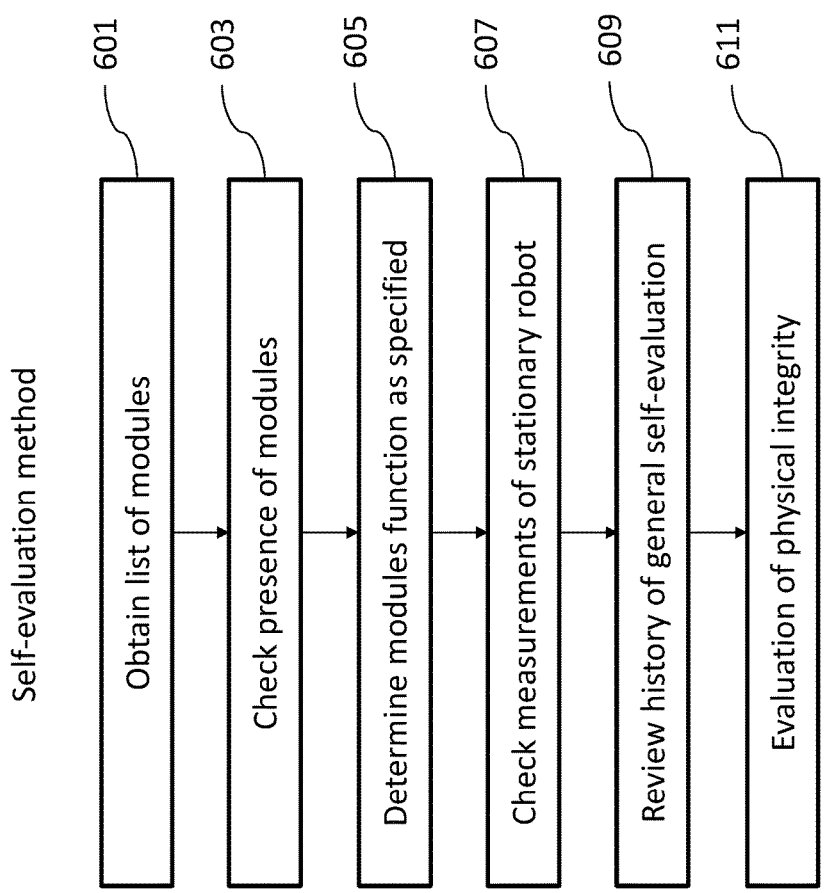
FIG. 6 illustrates a method for general self-evaluation.

In another aspect, a general self-evaluation method is provided. The method can be utilized to evaluate physical fault of a robot 100, either prior to its operation or during the operation. FIG. 6 illustrates a method of general self-evaluation. The method may begin with obtaining a list of modules (or any other components or systems) of a robot 100 (operation 601). The modules may be the same as described in FIG. 2 and/or FIG. 3, or may include any of the components that are part of the robot or interacting with the robot. The modules may be respectively associated with module identifiers. The module identifiers may be created or inputted during the design phase of the robot. Operating and repair history associated with each module may be obtained and stored in a memory coupled to, or interacting with the FDD system 206. Next, the presence of the modules may be checked (operation 603). The FDD system may be configured to confirm the presence of each module by the module identifier and the full history of each module. Once it is confirmed that the modules are present, functions associated with each module may be checked under internal condition tests (operation 605). Each module may be prompted to conduct an internal condition test to confirm correct functionality.

In the following operation 607, the static characteristics of the robot are obtained and examined. The static characteristics may include, for example, weight, temperature, power consumption, motor and sensor specification and so forth. Next, a history of the general evaluation may be reviewed (operation 609). The history of the general evaluation may be stored in one or more storage devices or databases associated with the robot and the FDD system 206. The evaluation history may include data on each module and its operation history, fault diagnosis history, modification history, and the like. Next, evaluation of physical fault detection and diagnosis may be performed (operation 611), which may involve a program of fault detecting and diagnostic exercises described herein. The process of performing such exercises can be the same process as described previously, for example, in FIGS. 4 and 5.

Figure 7:
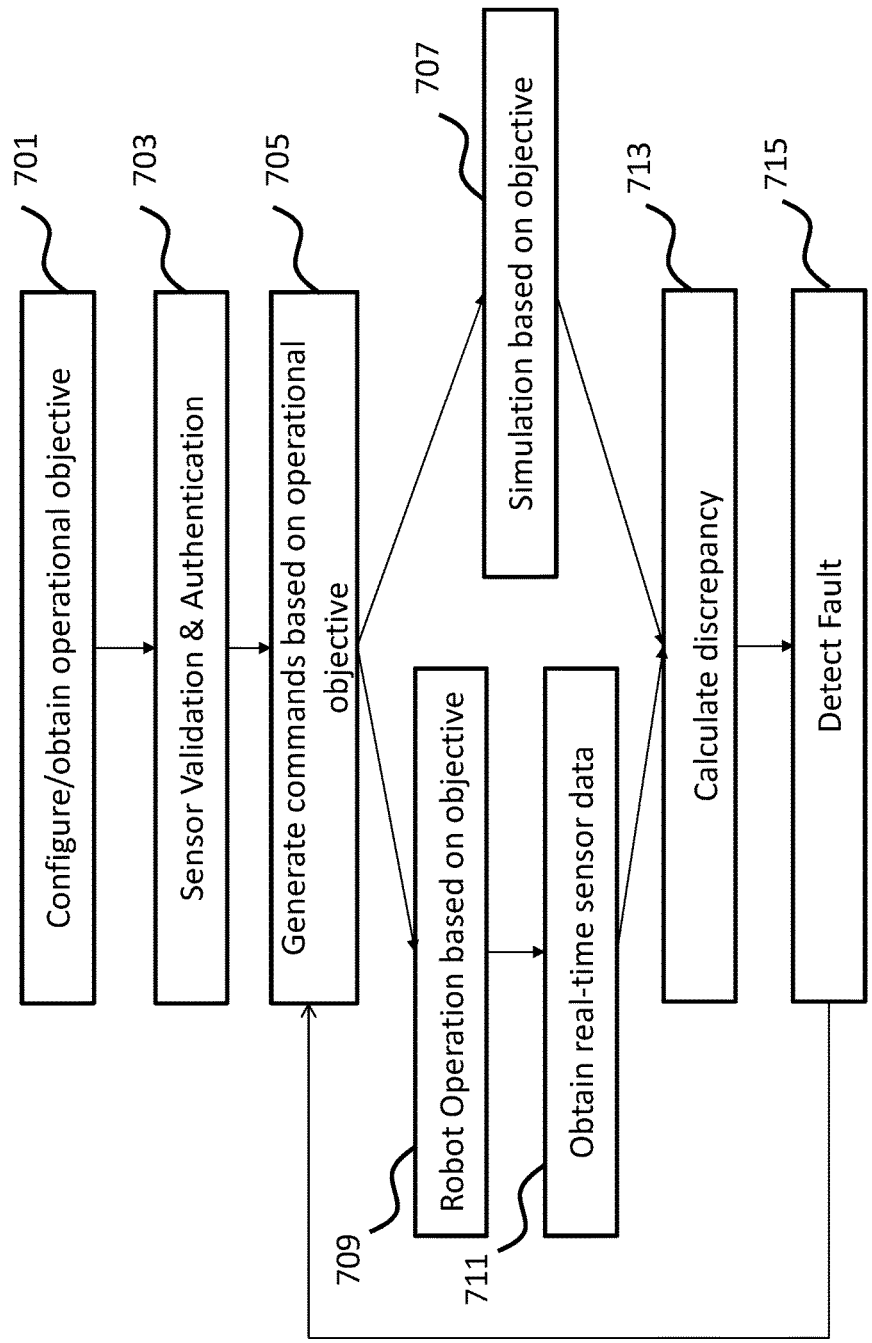
FIG. 7 illustrates a method for operational fault identification and command update.

FIG. 7 illustrates a method for operational fault identification and update. The process may begin with obtaining an operational objective of the robot 100 (operation 701). The operational objective may include information regarding the operations performed by the robot and conditions such as environment of the robot. The operations or functions to be performed can be obtained from an operator of the robot 100, control system 210, or one or more memory or storage devices of the robot. The operation conditions such as the environment can be obtained by one or more sensors located onboard the robot, in the environment (e.g., environment sensors 104), or by sensors onboard other robots (e.g., sensory system 204).

Next, the one or more sensors of the robot 100 may be validated and authenticated (operation 703). Sensors can be validated through authentication by confirming that individually or collectively they yield a known or verifiable value. For example, self-sensing proprioceptors and interoceptors can be authenticated when they match the simulation values of the USM module 308. Various other methods may be used for authenticating sensors as described above, including methods described in FIG. 4.

Once the validity and authenticity of the sensors are confirmed, the robot or a plurality of robots 100 may be controlled to function and operate according to their specific operational objectives 705. During the operation, the robot or a plurality of robots may perform functions in response to commands generated from their own control system 210 (operation 709). In the meantime, real-time or near real-time sensor data may be collected 711 from one or more exteroceptive sensors on the robot, in the environment (e.g., environment sensors 104), or other robots. During the operation, simulations based on the operation objective may be performed in parallel (operation 707), for example, by the FDD system 206. In some cases, a subset of the sensor data such as payload, operation conditions, temperature, and the like may be input to the simulation to generate real-time simulation results. The actual performance of the robot obtained from the sensor data and the simulation results of the robot performance may be compared and calculated for discrepancy 713. Based on the calculated discrepancy, fault may be detected (operation 715) and diagnosed. Fault detection and diagnosis may follow the operations described in FIGS. 4 and 5. The robot commands may or may not be updated based on the detected fault. For instance, if the diagnosis reveals a fault that requires additional operations for the robot to perform, the robot commands are updated to reflect those adjustments.

Figure 8:
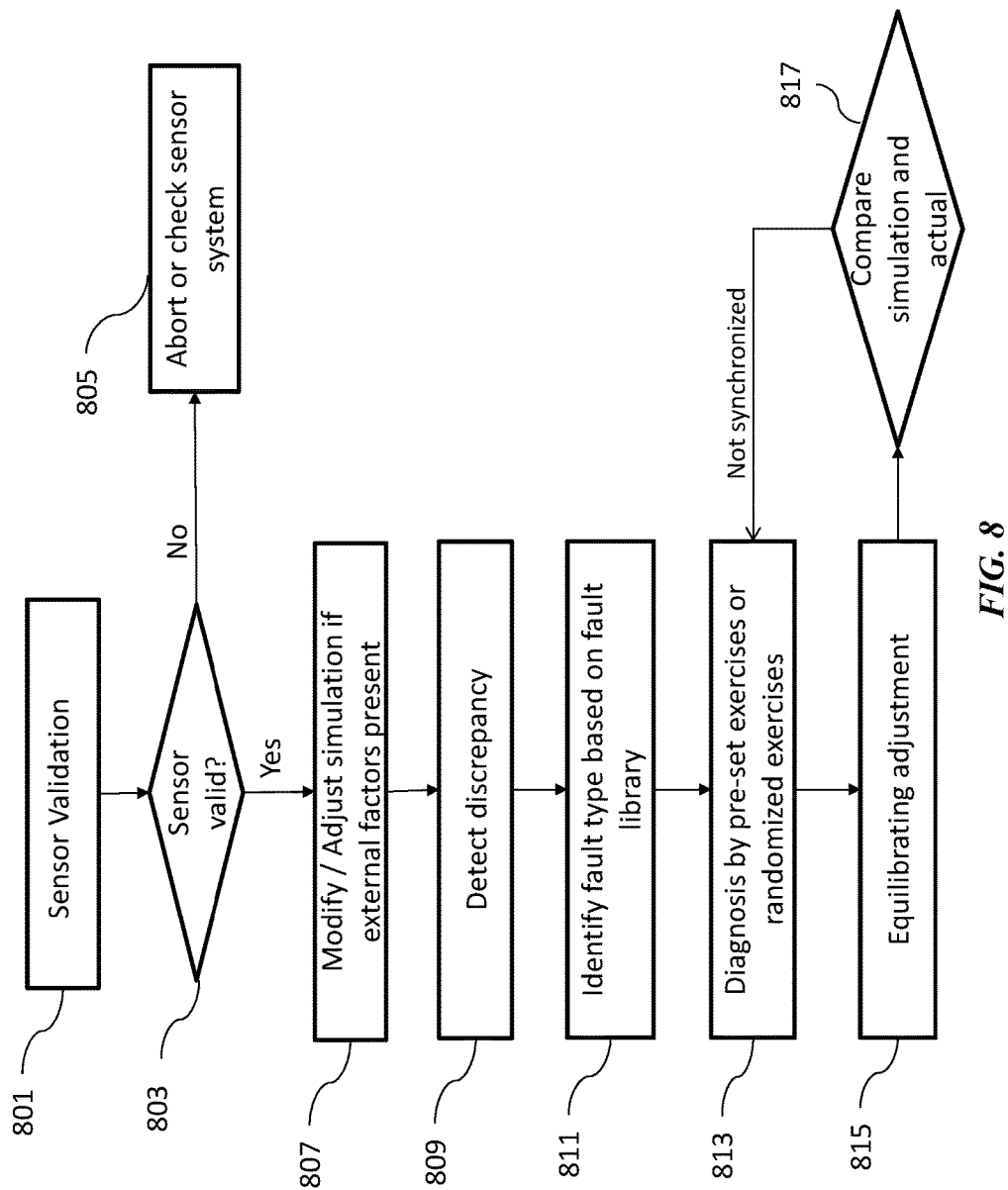
FIG. 8 illustrates a method for detecting and diagnosing fault, and synchronizing operations.

FIG. 8 illustrates a method for detecting and diagnosing fault, and synchronizing operations of the robot 100. The method may begin with a sensor validation operation 801, the method which is also described above (e.g., FIG. 4). In some embodiments, the FDD system 206 may be configured to check the validity of the sensors (operation 803). If the sensors are confirmed to be not valid, the process may be aborted and an alert may be generated to indicate the error (operation 805). If the sensors are confirmed to be valid, the process may proceed to the operations of the robot.

The sensor systems 204 may be configured to obtain data regarding the external environment. If one or more external factors are present, the FDD system 206 may be configured to augment or update the USM module 308 simulation in order to account for the external factors. In some embodiments, the XRDS module 306 may be configured to provide information or data to augment or update the USM module. The robot may or may not undergo general self-evaluation before the actual operations (e.g., FIG. 6).

Next, the FDD system 206 may be configured to detect discrepancy between actual robot performance and simulated performance using the models stored in the USM module and/or the models stored or accessible by the XRDS module 306, as adjusted for external factors (operation 807). For example, if external factors affect the operations of the robot, the FDD system 206 may be configured to adjust for the external factors and execute the discrepancy detection operation (operation 809), or the FDD system 206 may be configured to run the discrepancy detection operation without external factor adjustments if no external factors are present. If no discrepancy is detected, the process is complete. If a discrepancy is detected, then based on the detected discrepancy, a cause of anomaly or fault type may be identified based on a fault library (operation 811). The fault library may store typical or atypical fault types associated with various robots under different conditions and operational objectives. If the fault is identified to be correlated or associated with internal fault, the process may proceed to further diagnose the fault by performing pre-set exercises and/or randomized exercises (operation 813), for example, as described herein in FIG. 5. Once the diagnosis is identified the robot may be configured to enter the equilibrating adjustment phase (operation 815).

Equilibrating Adjustment

Once the cause of the anomaly is identified, the nature and magnitude of the fault can be determined through further diagnostic exercises, including exercises described herein. The FDD system 206 may also serve various additional functions. The FDD system may be configured to self-validate the diagnosis, or modify/update the simulations calculated by the robot 100 for continued operations.

In some embodiments, additional exercises may be included for verifying the fault diagnosis using equilibrating adjustment methods. The cause may be verified when adjustments to the USM module 308 simulation parameters bring the simulation back into alignment with actual performance in the exercises (operation 817). In some embodiments, the SPA module 304 may be configured to provide such alignment of simulation and actual operations. If the adjustments to the USM module 308 simulations bring the simulations back into alignment with actual performance, the diagnosis is tentatively confirmed. However, if the adjustments fail to bring the simulation back into alignment with the actual performance of the robot, the FDD system 206 may be configured to re-enter the diagnosis phase to figure out a more accurate diagnosis (back to operation 813). Alternatively, equilibrating adjustment may be utilized as a trial and error method for diagnosis. Various adjustments to the simulation module may correspond to a specific cause or a diagnosis, and if the adjustments result in the alignment of simulation and actual operations, the diagnosis may be confirmed.

In some embodiments, the FDD system 206 may be configured to provide equilibrating adjustments to the USM module 308 for the purposes of continued operations under the diagnosed fault. An equilibrating adjustment can allow the USM module simulation to work effectively until the diagnosed or identified problem is rectified at the physical level, at which time the simulation parameters can be reset to their nominal values. For example, if an arm consistently operates more slowly than expected, the problem may be associated with a stiff joint: a consistent discrepancy between measurements and real operations can be confirmed by moving the arm experimentally and observing that the drag occurs consistently. The source of the problem can be investigated or identified by checking the limb for signs of frictional heating. Once a successful diagnosis of the anomalous pattern (such as a stiff joint) has been made, an equilibrating adjustment can be made to the USM module 308 to realign the calculation of predictions—based on model-based simulations—by adjusting the correct nominal response parameters so as to match the current degraded condition. This adjustment may be provided by the SPA module 304. This adjustment to the USM module may restore accurate predictions, and when actions are calculated according to the revised predictions, control or robot commands can correctly invoke the appropriate force to achieve the intended outcome. If this one correction brings all other predictions of the USM module simulation back into line with actuality, then a number of discrepancies will have been shown to arise from this single source, a stiff joint. The equilibrating adjustment can therefore be a sufficient representation of the symptoms of the problem. Thus an equilibrating adjustment that restores equality between predicted and actual outcomes corrects the performance of the robot, and can define and characterize the fault.

In some embodiments, under certain conditions, the equilibrating adjustment can temporarily adjust the USM module simulation to bring it into accordance with the robot's current state. The equilibrating adjustment may correct the USM module simulation enough so that when the robot 100 employs the USM module to calculate its movements, the resulting predictions can achieve sufficient accuracy for the robot to function effectively. The equilibrating adjustment may have a pre-set adjustment range. The pre-set adjustment range may be a safety range within which the robot may operation and function without significant damage. In some cases, when the adjustment is beyond the range, the adjustment may be aborted and an alert may be generated to indicate a significant fault. If the adjustment is not beyond a normal or safety range, the robotic system can be configured to continue to detect discrepancy by the FDD system 206, for example, by using USM module 308 with adjusted parameters, and identify any subsequent fault type.

Computer Control Systems

Figure 9:
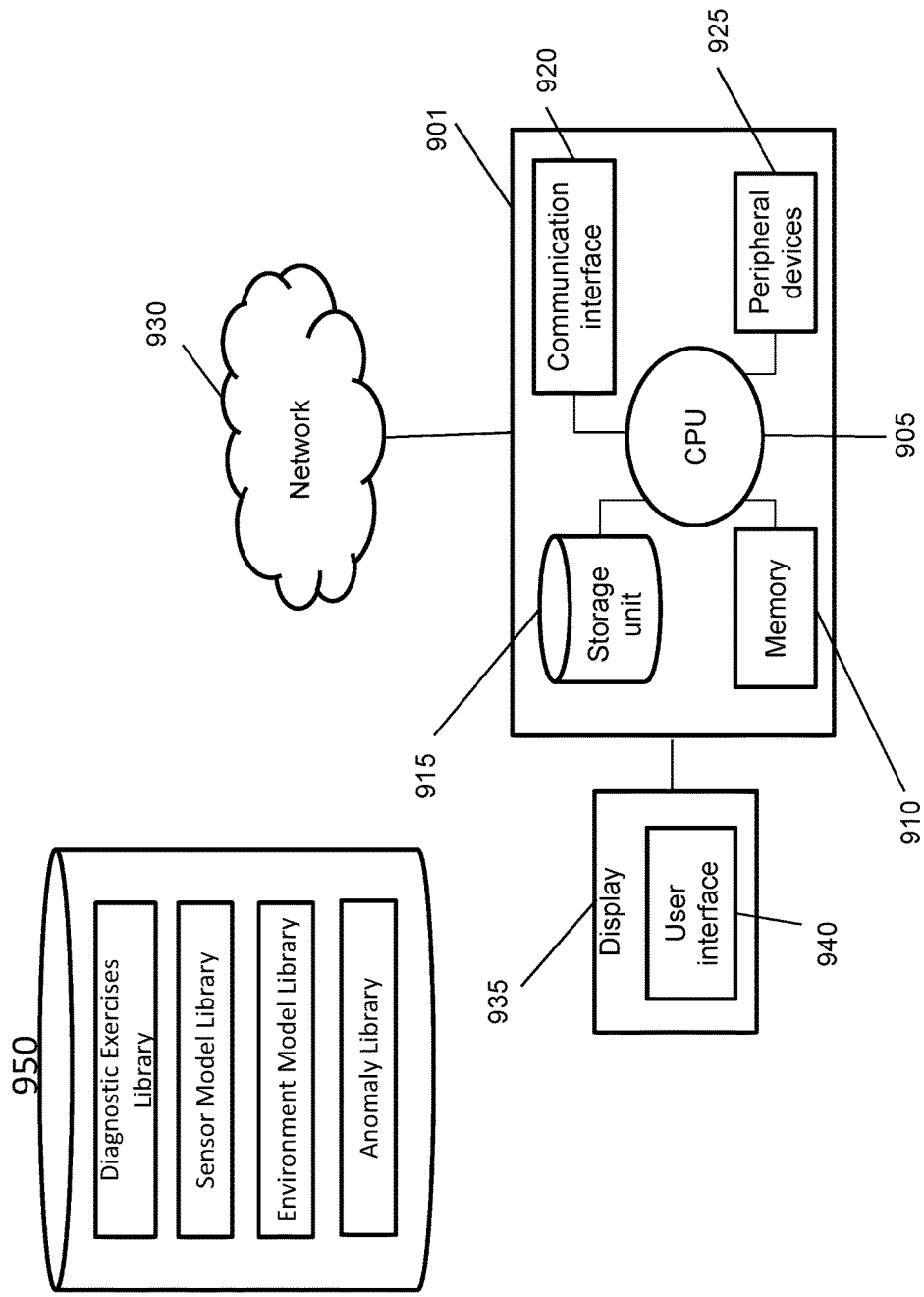
FIG. 9 illustrates example computer architecture applicable to any computer system and robot systems discussed herein.

The present disclosure provides computer control systems that are programmed to implement methods of the disclosure, which may comprise one or more of software, hardware, or firmware, or any combination thereof. FIG. 9 illustrates example computer architecture applicable to any computer system and robot systems discussed herein. The computer system 901 can regulate various aspects of the present disclosure, such as, for example, implement one or more methods described above. The computer system may be implemented to train a mental capability of a robot system such that the robot system may be able to intelligently adapt to various environments and perform self-evaluation. The computer system may be adapted to one or more types of robots and may be customized for a specific type of robot. In some embodiments, the computer system may represent the FDD system 106 as described in FIG. 1, the FDD system 206 and its modules described in FIG. 3, or the robot 100 as described in FIG. 2. The computer system 901 can be an electronic device of a user or a robot operator, or a computer system that is remotely located with respect to the electronic device. The electronic device can be a mobile electronic device.

The computer system 901 includes a central processing unit (CPU, also "processor" and "computer processor" herein) 905, which can be a single core or multi core processor, or a plurality of processors for parallel processing. The computer system 901 also includes memory or memory location 910 (e.g., random-access memory, read-only memory, flash memory), electronic storage unit 915 (e.g., hard disk), communication interface 920 (e.g., network adapter) for communicating with one or more other systems, and peripheral devices 925, such as cache, other memory, data storage and/or electronic display adapters. The memory 910, storage unit 915, interface 920 and peripheral devices 925 are in communication with the CPU 905 through a communication bus (solid lines), such as a motherboard. The storage unit 915 can be a data storage unit (or data repository) for storing data. The various components of a computer system may be implemented onboard a robot and may be distributed across the various robotic parts. For example, the CPU may reside in one part of the robot and the communication interface may reside in another part of the robot. The computer system 901 may also be integrated into the robot to form various parts of the robot.

The computer system 901 can be operatively coupled to a computer network ("network") 930 with the aid of the communication interface 920. The network 930 can be the Internet, an internet and/or extranet, or an intranet and/or extranet that is in communication with the Internet. The network 930 in some cases is a telecommunication and/or data network. The network 930 can include one or more computer servers, which can enable distributed computing, such as cloud computing. The network 930, in some cases with the aid of the computer system 901, can implement a peer-to-peer network, which may enable devices coupled to the computer system 901 to behave as a client or a server. For example, the network 930 may enable a plurality of robots to communicate to one another.

The CPU 905 can execute a sequence of machine-readable instructions, which can be embodied in a program or software. The instructions may be stored in a memory location, such as the memory 910. The instructions can be directed to the CPU 905, which can subsequently program or otherwise configure the CPU 905 to implement methods of the present disclosure. Examples of operations performed by the CPU 905 include fetch, decode, execute, and writeback. The one or more methods may be implemented in the software or program for monitoring fault of the robot. The software or program may not change the control system (e.g., control system 210) of the robot. The software or program may be added on top of the control system of the robot.

In some cases, the software may provide a user interface for a user to view information regarding the diagnosis and/or fault status of the robot. The user may be an administrator of one or more robots. The user interface may provide various aspects of the robot's functions as described herein. For example, the user interface may provide graphical illustrations of the discrepancy between the simulated results and the actual measurements from various sensors on the robot. The user interface may also visualize the environment in which the robot is located. The user interface may also provide various graphical illustrations as to which type of exercises the one or more robots are performing. The user interface may also provide visual illustrations of the robot's movements. The user interface may also provide guided steps to recover the robot from a fault. The user may also be permitted to set parameters for monitoring fault such as schedules, conditions and the like. The software or program may be configured to be able to interface with various robots and/or robotic systems.

The CPU 905 can be part of a circuit, such as an integrated circuit. One or more other components of the system 901 can be included in the circuit. In some cases, the circuit is an application specific integrated circuit (ASIC). The control system 210 and the FDD system 206, for example, may comprise the CPU.

The storage unit 915 can store files, such as drivers, libraries and saved programs. The storage unit 915 can store user data, e.g., user preferences and user programs. The computer system 901 in some cases can include one or more additional data storage units that are external to the computer system 901, such as located on a remote server that is in communication with the computer system 901 through an intranet or the Internet.

The storage unit can store one or more libraries 950. The one or more libraries may comprise data and information for evaluation and/or monitoring fault of various robotic systems. The libraries may include a diagnostic exercises library which contains sets of pre-specified exercises and rules for generating randomized exercises; a sensor model library which contains models for some or all of the sensors to be used by the USM module 308 for simulation; an environment model library which may contain one or more typical environment types such as indoor, outdoor, expected robot-environment interactions and the like; anomaly library which contains theoretic and empirical anomaly types for assisting identifying an anomaly type. One or more of the aforementioned libraries may be combined to form a single library. Alternatively, any one of the aforementioned libraries may comprise multiple sub-libraries. Each type of robot may also have different sets of libraries. Libraries may also differ based on the goal or the operation of the robot. The various components of the storage unit may be part of the robot or may reside external to the robot. For example, one or more libraries may reside internally in a storage unit as part of a robot and other libraries may reside in storage units external to the robot (e.g., accessible via wireless or wired networks).

The computer system 901 can communicate with one or more remote computer systems through the network 930. For instance, the computer system 901 can communicate with a remote computer system of a user or a robot operator. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), personal digital assistants, or other robots with networking capabilities. The user can access the computer system 901 via the network 930.

Methods as described herein can be implemented by way of machine (e.g., computer processor) executable code stored on an electronic storage location of the computer system 901, such as, for example, on the memory 910 or electronic storage unit 915. The machine executable or machine readable code can be provided in the form of software. During use, the code can be executed by the processor 905. In some cases, the code can be retrieved from the storage unit 915 and stored on the memory 910 for ready access by the processor 905. In some situations, the electronic storage unit 915 can be precluded, and machine-executable instructions are stored on memory 910.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 901, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 901 can include or be in communication with an electronic display 935 that comprises a user interface (UI) 940 for providing, for example, real time simulation results of the robot, diagnosis reports, alerts generated during fault monitoring and the like. Users may be allowed to review the fault history of the robot or set schedules for performing exercises, including self-evaluation exercises, pre-determined exercises or randomized exercises. Examples of UI's include, without limitation, a graphical user interface (GUI) and web-based user interface. Below are a few examples of applying the provided methods to various robots under different situations.

In some cases, the provided computer architecture may be configured to operate as Indicative Decentralized Control (IDC). IDC is a multi-level control procedure. Control is "indicative" in the sense that the control center indicates goals and determines ranges of activity and priorities for various components. Control may be "decentralized" in the sense that the separate components are free to act within the scope of established priorities and ranges of activity as they perform as best they can relative to the indicated goals they have been assigned. Decentralized control can make sense when the activities of local components should be determined in their individual local contexts, and when proximate components can benefit by cooperating locally. DC may also be advantageous because decentralized calculations can be performed more efficiently than centralized ones. DC can allow local response to local sensory inputs and to other proximate local responses to proceed rapidly, while also providing for local circumstances and responses to be appraised less rapidly from a higher perspective and coordinated as necessary.

Example 1—A Wobble in a Limb

The robot 100 may have access to data and information regarding its own strength and the strength of each physical element of its body (e.g., physical system 202). To determine if it is capable of lifting an object, the robot may need to estimate the object's weight by shifting the object sideways or lifting one corner while measuring the resulting load on the robot's own joints. By performing one or more of the actions—or other analogous actions—listed above, the robot may be able to sense or measure the loads on its joints, sinews and so on. The robot may also be able to calculate a safe way of lifting the object and then compute whether its components can tolerate the load. For example, while it lifts the object, the robot may continuously measure the loads on its various joints. The USM module can calculate these figures based on scientific principles. Sensors that allow the robot to calculate the loads on its joints and sinews can also detect the presence and degree of any vibration or other instability. As the robot constantly measures the load on its joints in routine activities, it can detect any wobble.

Example 2—A Device Planted Outside or Inside

Many threats can be associated with planted—without knowledge or secretly—devices. The device could be a microphone or video camera, an explosive device, a canister carrying some poisonous substance, a jamming mechanism capable of broadcasting strong signals, or vibrations to interfere with the robot. The device could be activated by a timer or controlled remotely. The device could be attached to the outside by glue or magnetism, or placed within the robot through an access hatch. The provided system and method may allow the robot to detect a bomb that has been planted inside or on its surface.

The robot 100 may continuously calculate, via the sensor system 204 and USM 308, its weight, center of mass and distribution of mass in order to stabilize its body and maintain its balance in all kinds of situations. If a bomb is planted on it, the robot may be able detect small discrepancies between its actual weight, points of balance and inertia and the values predicted by the USM module. From this information, it may be able to calculate the small added weight and mass of the bomb as well as the position of that mass within or upon its body, by analyzing the object's impact on body weight, distribution of mass, points of balance and actual movements, for example, as the robot performs diagnostic exercises.

The provided system may also enable the robot to maintain its balance when it is standing on a ladder to change a light bulb. The robot may be able to maintain its balance while standing on a ladder and reaching out to change a light bulb, because it knows how much weight and mass it has and how its mass is distributed throughout its body. Accordingly, it can properly calculate the position of its limbs so as to keep its balance and maintain its stability.

Example 3—Two Mismatched Parts

This example illustrates how precisely modeling energy and force contributes to avoiding fault as well as maintaining ordinary functions. The robot's 100 USM module may fully specify power requirements as a function of physical effort, as well as the amount of physical effort that different situations require. When the robot plans to activate motors or other generators of motive force, the USM module predicts energy usage, and continues to predict usage moment by moment while the activity is underway. If the actual energy used, as measured by the CSM module, exceeds planned levels, the discrepancy may result from excess external load or an internal anomaly. Subsequent diagnosis may confirm a stiffness in a joint that results from mismatched parts. Thus, when the robot knows the energy-response qualities of its moving joints, it will detect any slowing and reduced response relative to its USM specifications due to excess stiffness from a part mismatch or some other cause.

The provided method may also enable the robot to time its movements when it meets a person coming the other way in a hall and needs to step aside to make way. To time its movements as its slips by someone else walking down the hall, the robot may need to coordinate the responses of a number of motors and joints based on its knowledge of the rate and degree of response as a function of energy applied.

Example 4—An Intermittent Electrical Short Circuit

This example illustrates how a robot can detect an intermittent short-circuit in the wiring. As the robot continuously monitors its power usage, and compares every measurement throughout the body with the prediction based upon the USM, it can potentially discover any intermittent short circuits, determine the location of the short circuits in the body, and associate them with particular concurrent operations when the power is drawn.

The provided system and method may also allow the robot to plan its activities when operating on battery power and about to require a recharge. To plan its activities, the robot will need to calculate and budget its power usage. In order to effectively budget power usage, the robot will need to measure electrical usage throughout its body. The robot may further require reliable modeling of electricity usage in various activities, so that it can take account of its planned activities to accurately predict power usage.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for detecting and diagnosing fault of a robot, comprising:
    (a) mechanically moving a robotic component of the robot from a first position to a second position within an environment for operation of the robot, and collecting sensor data from a plurality of sensors during the operation;
    (b) performing, with aid of one or more processors, simulation of the robot based at least in part on one or more control signals as input to simulation models of the robot to generate an output of the simulation models, wherein the one or more control signals control the operation of the robot;

(c) determining continuously in real-time, with aid of the one or more processors, discrepancy measurements between (i) the sensor data and (ii) the output of the simulation models, wherein the output of the simulation models and the discrepancy measurements are updated in real-time during the movement of the robotic component from the first position to the second position, and wherein the discrepancy measurements beyond a pre-determined threshold are indicative of physical fault; and (d) performing a diagnosis exercise based at least in part on the discrepancy measurements to identify a cause of the physical fault, the diagnosis exercise comprising pre-determined robotic operations or randomly generated robotic operations, wherein the diagnosis exercise comprises mechanical movement of the robot.

2. The method of claim 1, wherein the sensor data comprises internal sensor data and external sensor data.

3. The method of claim 2, wherein the internal sensor data relates to an internal state of the robot or motion of the robot.

4. The method of claim 2, wherein the external sensor data relates to the environment sensed by the robot.

5. The method of claim 1, wherein the plurality of sensors are validated and authenticated.

6. The method of claim 5, wherein the plurality of sensors are validated and authenticated by cross-checking among the plurality of sensors.

7. The method of claim 1, wherein the plurality of sensors include sensors onboard the robot, onboard other robots, or located in the environment of the robot.

8. The method of claim 1, wherein the output of the simulation models and a configuration of the robot derived from the sensor data are used to obtain visual information received from visual sensors that are in motion.

9. The method of claim 1, wherein the physical fault comprises internal fault or external influence.

10. The method of claim 1, wherein the pre-determined robotic operations are designed to diagnose a cause among multiple potential known causes.

11. The method of claim 1, wherein the randomly generated robotic operations are designed to determine previously unknown causes.

12. The method of claim 9, wherein the pre-determined robotic operations comprise vibration-inducing and strain-inducing motions of the robot.

13. The method of claim 1, further comprising performing Bayesian inference or self-diagnosis to identify the cause of the physical fault.

14. A system for detecting and diagnosing fault of a robot deployed in an environment, the system comprising:
one or more processors individually or collectively configured to:
(a) mechanically move a robotic component of the robot from a first position to a second position within the environment for operation of the robot, and collect sensor data from a plurality of sensors during the operation;
(b) perform simulation of the robot based at least in part on one or more control signals as input to simulation models of the robot to generate an output of the simulation models, wherein the one or more control signals control the operation of the robot;
(c) determine continuously in real-time discrepancy measurements between (i) the sensor data and (ii) the output of the simulation models, wherein the output of the simulation models and the discrepancy measurements are updated in real-time during the movement of the robotic component from the first position to the second position, and wherein discrepancy measurements beyond a pre-determined threshold are indicative of physical fault; and
(d) perform a diagnosis exercise based at least in part on the discrepancy measurements to identify a cause of the physical fault, the diagnosis exercise comprising pre-determined robotic operations or randomly generated robotic operations, wherein the diagnosis exercise comprises mechanical movement of the robot.

15. The method of claim 1, wherein the discrepancy measurements are nominal discrepancy measurements that are updated during the operation of the robot.

16. The system of claim 14, wherein the discrepancy measurements are nominal discrepancy measurements that are updated during the operation of the robot.

* * * * *